Patented Dec. 4, 1951

2,577,231

UNITED STATES PATENT OFFICE 2,577,231

DIAZINE SULFONAMIDES AND METHODS OF PREPARING THE SAME

James W. Clapp, Darien, and Richard O. Roblin, Jr., Riverside, Conn., assignors to American Cyanamid Company, New York, N. Y., a corporation of Maine No Drawing. Application April 17, 1950, Serial No. 156,484

14 Claims. (Cl. 260—250)

This invention relates to the preparation of new organic compounds. More particularly, it relates to diazine sulfonamides and their preparation.

It is generally recognized that numerous functions and actions of the human body are largely controlled by a wide variety of enzymes. One of these numerous enzymes is called carbonic anhydrase because it is involved in the metabolism of carbon dioxide. This enzyme has other functions too, since it can catalyze the conversion of carbon doxide to carbonic acid. The excretion of acid by the kidneys is thought to be due to this function of carbonic anhydrase.

The excretion of acid by the kidneys is one method by which the body normally conserves salt. The maintenance of a constant ratio of salt to water in the body is of utmost importance for general health. In some cases, however, excess salt and water accumulate in the tissues causing a condition which is called edema. It is frequently encountered in association with congestive heart failure. The excess salt and water cause an uncomfortable swelling of the tissues and place an added strain on the heart. To combat this condition so-called diuretic agents are sometimes used to promote the excretion of the excess salt and water. These agents, for the most part, in the past, have been mercury derivatives. Since these compounds contain mercury, they are not without toxicity on continued use and must be administered by injection.

Shortly after sulfanilamide came into widespread use, Mann and Keilin, Nature, 146, 164 (1940), found that it, but none of the other sulfa drugs, specifically inhibit the enzyme carbonic anhydrase. Within the past year or two sulfanilamide was experimentally used in several cases of congestive heart failure. While the sulfanilamide helped to promote the excretion of excess salt and water, it was not sufficiently active to be safely administered in adequate doses.

We have found that diazine sulfonamides show much greater activity than sulfanilamide in inhibiting carbonic anhydrase. The new compounds of the present invention may be illustrated by the following general formula:

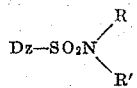

in which R and R' are hydrogen, alkyl, alkaryl, aryl or heterocyclic radicals and Dz is a diazine radical such as pyrimidine, pyrazine and pyridazine. The diazine radical may have present one or more of the following substituents; an alkyl group, a halogen radical and the like.

The compounds are, in general, white crystalline solids having definite melting points and are reasonably soluble in water.

The compounds of the present invention are prepared by dissolving a mercaptodiazine in an aqueous acid solution and passing chlorine gas into said solution to produce the corresponding sulfonyl chloride. This product is then treated with an excess of ammonia in the form of liquid ammonia or amonium hydroxide to produce the unsubstituted sulfonamides and with an alkylamine, alkarylamine, arylamine or heterocyclic amine to produce compounds substituted on the sulfonamide group.

The reaction time is not too critical but chlorine should be added at such a rate that the temperature does not raise excessively and until an excess is present in the reaction mixture. The temperature during the chlorination is preferably maintained within the range of —10° C. to 25° C. When reacting the sulfonyl chloride with ammonia or the amine a higher temperature may be used up to 60° C. or higher. Obviously, the temperature for the amination should not be higher than the boiling point of the particular amine used.

The amines which may be used in the process of the present invention may be primary amines such as methylamine, ethylamine, propylamine, phenylamine, para-methylphenylamine, benzylamine, 2-aminothiazole and the like. Secondary amines such as diethylamine, dipropylamine, dibutylamine and the like can also be used.

The compounds of the present invention were found to be effective carbonic anhydrase inhibitors and may prove valuable in the relief of edema associated with congestive heart failure or in other conditions where inhibition of carbonic anhydrase is useful. They are also active against certain micro-organisms.

The following examples illustrate the preparation of representative diazine sulfonamides from the corresponding mercaptodiazines. All parts are by weight unless otherwise indicated.

EXAMPLE 1

2-pyrimidinesulfonamide

Three parts of 2-mercaptopyrimidine are dissolved in 75 parts of 1 N hydrochloric acid. The solution is stirred in a cooling bath while chlorine is introduced through a capillary tube until the color of excess dissolved chlorine is pronounced. About thirty minutes is required. The temperature is held below 10° C. and preferably below 5° C. The precipitated solid is filtered and washed with a little ice-cold water.

The crude damp 2-pyrimidinesulfonyl chloride is added gradually to a large excess (about 350 parts) of liquid ammonia. After about thirty minutes, the excess ammonia is allowed to evaporate and the residue is extracted with a small amount of diluate ammonium hydroxide. The extract is treated with activated charcoal, filtered, and the filtrate made slightly acid, with chilling. If no precipitate forms, the solution is concentrated. The product is filtered and dried. The product is recrystallized from a minimum amount of water. The pure compound is a white crystalline solid, melting point 180.5°–181° C., with bubbling.

EXAMPLE 2

*5-chloro-2-pyrimidinesulfonamide*

5-chloro-2-mercaptopyrimidine is converted to the sulfonyl chloride by the method of Example 1. Four parts of the mercapto compound is suspended in 100 parts of 1 N hydrochloric acid, and chlorine is introduced for about seventy-five minutes. The crude damp sulfonyl chloride is converted to the sulfonamide with liquid ammonia by the method described above. The product is recrystallized from water. The pure compound is a white crystalline solid, melting point about 135°–140° C.

EXAMPLE 3

*4,6-dimethyl-2-pyrimidinesulfonamide*

4,6-dimethyl-2-mercaptopyrimidine is converted to the sulfonyl chloride by the method of Example 1. 2.5 parts of the mercapto compound are used, dissolved in 25 parts of 1 N hydrochloric acid, and chlorine is passed in for about thirty minutes. The product can be purified by dissolving in ether, drying the solution and removing the solvent in vacuo. The pure compound is a white crystalline solid, melting point 41°–42° C. The crude damp sulfonyl chloride is converted to the sulfonamide in liquid ammonia by the method desscribed above. It is recrystallized from water. The pure product is a white crystalline solid, melting point 200°–200.5° C., with bubbling. Yield, 46% theory, based on mercapto compound.

EXAMPLE 4

*4,6-dimethyl-2-pyrimidinesulfon-n-propylamide*

4,6-dimethyl-2-pyrimidinesulfonyl chloride is prepared and purified as described in Example 3. Four parts of the sulfonyl chloride are added gradually to 50 parts of dry n-propylamine with stirring in a cooling bath. The mixture was stirred an additional brief period, and the excess amine allowed to evaporate. The residue is stirred with water and acidified. The solid is filtered, redissolved in dilute sodium hydroxide and reprecipitated by acidification. The product is filtered and recrystallized from carbon tetrachloride. The pure compound is a white crystalline solid, melting point 111°–111.5° C.

EXAMPLE 5

*4,6-dimethyl-2-pyrimidinesulfondi-n-butylamide*

4,6-dimethyl-2-pyrimidinesulfonyl chloride is prepared and purified as described in Example 1. Four parts of the sulfonyl chloride are added gradually to 50 parts of di-n-butylamine with stirring in a cooling bath. The mixture was stirred about two hours and allowed to stand overnight. 100 parts of water are added, and the mixture is stirred and acidified. The precipitated oil crystallizes on chilling and rubbing. It is filtered, then resuspended in cold dilute acid, stirred well, refiltered, and dried. It can be purified by solution in ether, treatment with activated charcoal, filtration, and removal of the solvent. The pure compound is a white, waxy, crystalline solid, melting point 25.5°–26° C. The product is insoluble in water but soluble in most organic solvents.

EXAMPLE 6

*4,6-dimethyl-2-pyrimidinesulfon-p-toluide*

4,6-dimethyl-2-pyrimidinesulfonyl chloride is prepared and purified by the method previously described. Four parts of the sulfonyl chloride are added gradually to 50 parts of p-toluidine in 50 parts of dry pyridine, with stirring in a cooling bath. The solid dissolves, and the mixture is alowed to stand four hours. It is diluted with water and acidified. A solid crystallizes on rubbing and chilling. It is filtered and washed thoroughly with water. It is dissolved in dilute sodium hydroxide, and the solution is filtered and acidified. The precipitate is filtered and recrystallized from a large volume of carbon tetrachloride. The pure compound is a white crystalline solid, melting point 180.5°–181° C.

EXAMPLE 7

*4,6-dimethyl-2-pyrimidinesulfonbenzylamide*

4,6-dimethyl-2-pyrimidinesulfonyl chloride is prepared as described in Example 1. Five parts of crude damp sulfonyl chloride are added gradually to 50 parts of benzylamine. The mixture was stirred for some time, then diluted with water and acidified. The precipitated solid is filtered and washed, then redissolved in dilute sodium hydroxide, and filtered. The filtrate is acidified and the product is filtered and recrystallized from water. The pure compound is a white crystalline solid, melting point 130.5°–131° C.

EXAMPLE 8

*N-(2-thiazolyl)-4,6-dimethyl-2-pyrimidine-sulfonamide*

4,6-dimethyl-2-pyrimidinesulfonyl chloride is prepared and purified as previously described. Four parts of the sulfonyl chloride are added gradually to a mixture of 40 parts of 2-aminothiazole and 50 parts of dry pyridine, with stirring in a cooling bath. Continued stirring slowly gives complete solution. The pyridine is removed in vacuo and the residue is diluted with water and acidified. A brown solid slowly precipitates on chilling, and is filtered and washed, then redissolved in dilute sodium hydroxide. The solution is treated with activated charcoal, filtered, and acidified. The product is filtered, washed, and dried, then recrystallized from ethanol. The pure compound is a nearly white, crystalline solid, melting point 161°–163° C., with decomposition.

EXAMPLE 9

*2-pyrazinesulfonamide*

2-mercaptopyrazine is converted to the sulfonyl chloride by the method of Example 1. Two parts of the mercapto compound are used, dissolved in 50 parts of 1 N hydrochloric acid, and chloride is introduced for about fifty-five minutes. The crude oily sulfonyl chloride is converted to the sulfonamide by the method above, with the use of liquid ammonia. The product is recrystallized from ethyl acetate. The pure compound is a white crystalline solid, melting point 166°–166.5° C.

We claim:

1. Compounds of the group consisting of those having the general formula:

Dz—SO₂NH₂ in which Dz is a pyrimidine radical.

2. 2-pyrimidinesulfonamide.
3. 4,6-dimethyl-2-pyrimidinesulfonamide.
4. 4,6 - dimethyl - 2 - pyrimidinesulfonbenzylamide.
5. 4,6 - dimethyl-2-pyrimidinesulfon-n-propylamide.
6. 2-pyrazinesulfonamide.
7. A method of preparing compounds having the general formula:

Dz—SO₂NH₂ in which Dz is a pyrimidine radical which comprises dissolving a mercaptopyrimidine in an aqueous acid solution, passing chlorine into said solution, mixing the resulting product with a member of the group consisting of liquid ammonia and ammonium hydroxide and recovering the pyrimidinesulfonamide therefrom.

8. A method of preparing 2-pyrimidinesulfonamide which comprises dissolving 2-mercaptopyrimidine in aqueous hydrochloric acid solution, passing chlorine into said solution, mixing the resulting product with liquid ammonia and recovering said 2-pyrimidine-sulfonamide therefrom.

9. A method of preparing 4,6-dimethyl-2-pyrimidinesulfonamide which comprises dissolving 4,6-dimethyl-2-mercaptopyrimidine in an aqueous hydrochloric acid solution, passing chlorine into said solution, mixing the resulting product with liquid amomnia and recovering said 4,6-dimethyl-2-pyrimidinesulfonamide therefrom.

10. A method of preparing 4,6-dimethyl-2-pyrimidinesulfonbenzylamide which comprises dissolving 4,6-dimethyl-2-mercaptopyrimidine in aqueous hydrochloric acid solution, passing chlorine into said solution, treating the reaction product thus obtained with benzylamine and recovering said 4,6-dimethyl-2-pyrimidinesulfonbenzylamide therefrom.

11. A method of preparing 4,6-dimethyl-2-pyrimidinesulfon-n-propylamide which comprises dissolving 4,6-dimethyl-2-mercaptopyrimidine in aqueous hydrochloric acid solution, passing chlorine into said solution, mixing the resulting reaction product with n-propylamine and recovering said 4,6 - dimethyl-2-pyrimidinesulfon-n-propylamide therefrom.

12. A method of preparing 2-pyrazinesulfonamide which comprises dissolving 2-mercaptopyrazine in aqueous hydrochloric acid solution, passing chlorine into said solution, mixing the reaction product thus obtained with liquid ammonia and recovering said 2-pyrazinesulfonamide therefrom.

13. Compounds of the group consisting of those having the general formula:

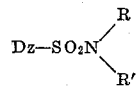

in which R and R' are members of the group consisting of hydrogen, lower alkyl, monocyclic aryl, monocyclic lower aralkyl and thiazolyl radicals and Dz is a monocyclic aromatic diazine having two nitrogen and four carbon atom radicals, consisting of those having nitrogens in the 1,3-positions and those having nitrogen in the 1,4-positions.

14. A method of preparing compounds having the general formula:

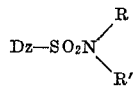

in which R and R' are members of the group consisting of hydrogen, lower alkyl, monocyclic aryl, monocyclic lower aralkyl and thiazolyl radicals and Dz is a monocyclic aromatic diazine having two nitrogen and four carbon atom radicals, consisting of those having nitrogens in the 1,3-positions and those having nitrogen in the 1,4-positions which comprises reacting said diazine having a mercapto group with chlorine in the presence of an aqueous acid solution and subsequently with a member of the group consisting of ammonia, a lower alkylamine, a monocyclic arylamine, a monocyclic lower aralkylamine and a thiazolylamine.

JAMES W. CLAPP.
RICHARD O. ROBLIN, Jr.

REFERENCES CITED

The following references are of record in the file of this patent:

Johnson et al.: Chem. Rev., 13, 198–199 (1933).
Northey: The Sulfonamides and Allied Compounds, Monograph Series, No. 106, page 484, Reinhold Publishing Corp., New York, N. Y. (1948).